(12) United States Patent
Yao et al.

(10) Patent No.: US 10,339,369 B2
(45) Date of Patent: Jul. 2, 2019

(54) FACIAL EXPRESSION RECOGNITION USING RELATIONS DETERMINED BY CLASS-TO-CLASS COMPARISONS

(71) Applicant: Intel Corporation, Santa Clara, CA (US)

(72) Inventors: Anbang Yao, Beijing (CN); Junchao Shao, Beijing (CN); Yurong Chen, Beijing (CN)

(73) Assignee: INTEL CORPORATION, Santa Clara, CA (US)

( * ) Notice: Subject to any disclaimer, the term of this patent is extended or adjusted under 35 U.S.C. 154(b) by 82 days.

(21) Appl. No.: 15/116,894

(22) PCT Filed: Sep. 16, 2015

(86) PCT No.: PCT/CN2015/089751
§ 371 (c)(1),
(2) Date: Aug. 5, 2016

(87) PCT Pub. No.: WO2017/045157
PCT Pub. Date: Mar. 23, 2017

(65) Prior Publication Data
US 2017/0308742 A1   Oct. 26, 2017

(51) Int. Cl.
*G06K 9/00* (2006.01)
(52) U.S. Cl.
CPC ..... *G06K 9/00308* (2013.01); *G06K 9/00221* (2013.01); *G06K 9/00281* (2013.01); *G06K 9/00302* (2013.01); *G06K 9/00* (2013.01)
(58) Field of Classification Search
None
See application file for complete search history.

(56) References Cited

U.S. PATENT DOCUMENTS

| 8,406,525 B2* | 3/2013 | Ma ..................... G06K 9/00275 382/159 |
| 2014/0063236 A1 | 3/2014 | Shreve et al. |
| 2015/0242678 A1 | 8/2015 | Lee et al. |

FOREIGN PATENT DOCUMENTS

CN          101908149          12/2010

OTHER PUBLICATIONS

PCT International Search Report and Written Opinion of the International Searching Authority for International Application No. PCT/CN2015/089751, dated Feb. 24, 2016.

(Continued)

*Primary Examiner* — Randolph I Chu
(74) *Attorney, Agent, or Firm* — Womble Bond Dickinson (US) LLP (57) ABSTRACT

Facial expressions are recognized using relations determined by class-to-class comparisons. In one example, descriptors are determined for each of a plurality of facial expression classes. Pair-wise facial expression class-to-class tasks are defined. A set of discriminative image patches are learned for each task using labelled training images. Each image patch is a portion of an image. Differences in the learned image patches in each training image are determined for each task. A relation graph is defined for each image for each task using the differences. A final descriptor is determined for each image by stacking and concatenating the relation graphs for each task. Finally, the final descriptors of the images of the are fed into a training algorithm to learn a final facial expression model.

15 Claims, 7 Drawing Sheets

(56) References Cited

OTHER PUBLICATIONS

Marios Kyperountas, et al., Facial Expression Recognition using Two-Class Discriminant Features, paper, Sep. 18, 2009, 8 pages.
Stefanos Zafeiriou, et al., Discriminant Graph Structures for Facial Expression Recognition, paper, Dec. 31, 2008, pp. 1528-1540 (13 pages).
International Preliminary Report on Patentability received for PCT Patent Application No. PCT/CN2015/089751, dated Mar. 29, 2018, 7 pages.

* cited by examiner

FACIAL EXPRESSION RECOGNITION USING RELATIONS DETERMINED BY CLASS-TO-CLASS COMPARISONS

CROSS-REFERENCE TO RELATED APPLICATION

This patent application is a U.S. National Phase Application under 35 U.S.C, § 371 of International Application No. PCT/CN2015/089751, filed Sep. 16, 2015, and International Application No. PCT/CN2016/080737, filed Apr. 29, 2016, entitled FACIAL EXPRESSION RECOGNITION USING RELATIONS DETERMINED BY CLASS-TO-CLASS COMPARISONS.

FIELD

The present description relates to determining a facial expression for a still or video image that includes a face and, in particular, to determining a facial expression using class-to-class relations.

BACKGROUND

With the proliferation of digital cameras in portable, ruggedized, and desktop devices, there is a related desire to use these cameras in new ways. Some of these ways work with faces that are within the camera's field of view. By detecting and interpreting faces, many new functions are provided, such as identifying a known user, interpreting a user's expressions as commands or as other input, mapping a user's expressions to an avatar for a chat session, determining whether a user is paying attention to something in the user's field of view, and more.

Facial expression is the most powerful nonverbal means for human beings to regulate communication with each other and to regulate interaction with the environment. With a facial expression recognition system different categories of facial expressions can be automatically identified in static images or in dynamic videos. The facial expression category identification can be used in many applications such as intelligent human-computer interaction (HCI), social robots, gaming and entertainment consoles and systems, online education and marketing services, medical treatment and diagnosis, etc.

In many techniques, in order to recognize and interpret faces, first a face region is identified. This may be done for a single image or for a sequence of images in a video. The images may be two or three-dimensional. Once a system determines that a particular region may have a face, then the alignment of the face is determined. Facial landmark points may then be used to determine the direction toward which the head is facing, to track eye movements, to recognize or distinguish two different faces and more.

After a face has been detected, the face can be analyzed for a facial expression. The appearance of a face may be analyzed using local representative features such as LBP (Local Binary Patterns) and Gabor features to describe the appearances of samples of different facial expressions. This kind of method is well suited for high volume processing in which there are many facial expressions to analyze. Alternatively, facial muscle movements may be analyzed in terms of the displacements of a set of unique action units (AUs). Traditionally, there are 46 manually defined facial constituent components referred to as AUs. This large number of components allows for small variations and complex facial expression variations to be recognized.

BRIEF DESCRIPTION OF THE DRAWINGS

Embodiments are illustrated by way of example, and not by way of limitation, in the figures of the accompanying drawings in which like reference numerals refer to similar elements.

DETAILED DESCRIPTION

A system and method are described herein to explicitly learn class-to-class action unit-aware features and encode the latent relations of action units for robust facial expression recognition. The described techniques provide better discrimination, very good accuracy, fast determination speed, and low memory requirements. The techniques may be used in creating a software stack for facial expression-based visual analytics applications including intelligent HCIs, social robots, online education and marketing, gaming and entertainment, medical treatment and assessment, etc.

The techniques described herein may be used in creating a software/hardware stack that is complementary to camera phone platforms and may be used to add advanced features to camera imaging modules. In addition to cameras for phones, such a software/hardware stack may also be used in other camera embedded and wearable devices, such as tablets, laptops, phablets, Chromebooks, PCs, wearable devices, smart-TVs, game-consoles and web servers.

As described herein a multi-task learning technique may be used to explicitly learn AU-aware features in a class-to-class (e.g., Happy vs. Surprise, Happy vs Sadness, etc.) manner AU-aware feature groups for respective class-to-class tasks are learned separately but not collectively. Latent relations within automatically learned AU-aware feature groups for each class-to-class task may be explicitly encoded with an undirected graph structure. These kinds of graph-structured relations regarding all learned class-to-class AU-aware feature groups may be used as facial expression descriptors.

AU-based facial expression recognition methods, describe facial muscle movements in terms of the displacements of a set of 46 manually defined facial constituent components referred to as AUs (action units). The specific number of AU's depends on the particular system being used. AUs refer to facial variations such as amounts of eyebrow lowering, eye closing, eyelid tightening (squinting), nose wrinkling, cheek raising, and many other types of facial movements. Using so many AUs has a high computational cost. It is difficult to simplify the set of AUs without losing accuracy because of the latent feature relations that characterize the complex interactions of active AUs. When some of the AUs are neglected, different facial expressions cannot be discriminated.

As described herein facial expression recognition is rendered quickly and accurately by explicitly learning class-to-class AU-aware features and then encoding their latent relations. First, a class-to-class (e.g., Happy vs. Surprise, Happy vs Sadness, etc.) multi-task learning method is used to automatically seek discriminative AU-aware features. The AU-aware feature groups for each respective task are learned separately from the candidate feature groups for each other task. In some embodiments, six different expressions are used, Angry, Disgust, Fear, Happy, Sadness and Surprise. A task is generated to distinguish each expression from each other expression, yielding fifteen different tasks. More or fewer expressions and tasks may be used depending on the intended use for the system. Second, an undirected graph based structure is used to explicitly encode latent relations within each task-specific AU-aware feature group. Third, a facial expression descriptor is formulated by grouping task-specific graph-structured relations together.

Each facial expression is an outcome of the movements of different facial muscles. Even very simple facial expression variations are caused by a blend of the movements of at least several facial muscles. As a result, the latent relations between active facial features for each expression may be used for visual or image based facial expression recognition. As described herein, active facial muscles are captured from separately learning class-to-class AU-aware features with a multi-task learning strategy. Then, dense relations within each task-specific AU-aware feature group are explicitly encoded as an undirected graph. Finally, a robust facial expression descriptor is formulated by grouping such task-specific graph-structured relations together.

Figure 1:
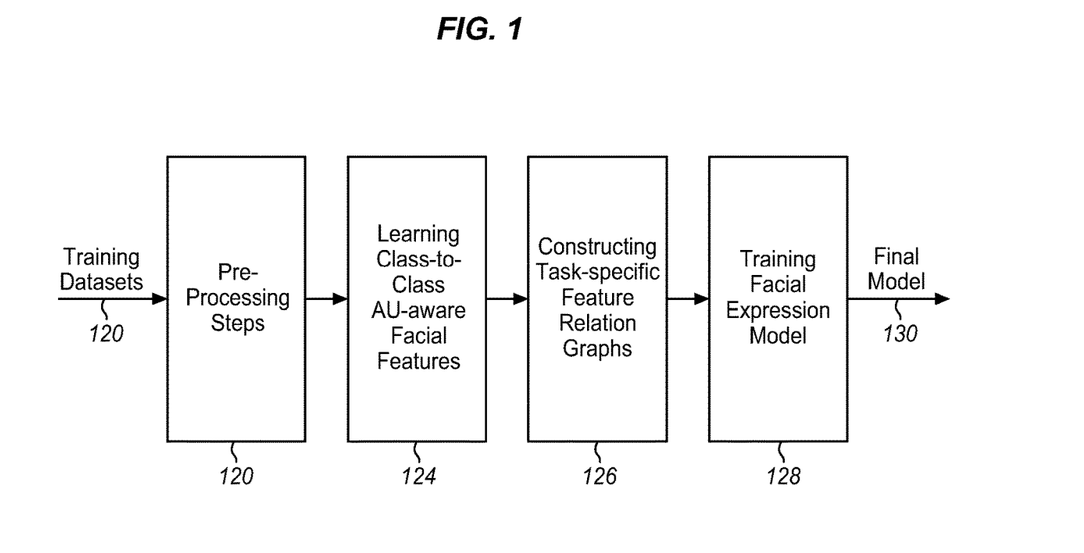
FIG. 1 is a block diagram of a sequence of operations for a training framework according to an embodiment.

FIG. 1 is a simplified block diagram of a sequence of operations for a training framework. Facial expression recognition may be performed by directly using the learned task-specific graph-structured feature relations and facial expression model developed from the training. For the training procedure four basic modules are shown. These are described in more detail below.

The training datasets 120, each including a set of face images annotated with manually labeled facial expressions, are received into the training process. Pre-processing at 122 is applied to these training datasets in preparation for analysis. The facial features are then learned at 124. This is done by comparing one class of expressions to another class of expressions taking the action unit model into consideration. The class-to-class comparisons learn features that consider AU but the full AU processing is not required.

At 126 undirected graphs are constructed for the relationship of features for each task. The tasks are the class-to-class comparisons of the previous operation 124. Each task has a feature relation graph so that when analyzing an unknown image, the graphs may each be applied to determine the expression in the image.

Pre-Processing Images

The image pre-processing 122 may be performed in any of a variety of different ways, depending on the particular implementation. In some embodiments, three main steps may be used both in testing and also in analyzing unknown images: face detection; facial landmark detection; and image normalization. Face detection may be determined in any of a variety of different ways, such as adaptive boosting (AdaBoost). Face and landmark detection may be done together using regressive techniques such as explicit shape regression (ESR) to identify shapes and facial components.

Once face and related landmark positions are all successfully detected, the subsequent pre-processing operation may be face image normalization. The normalization may be used to suppress the effect of two-dimensional in-plane face transformations and small three-dimensional out-of-plane face motions. In some embodiments facial landmarks may be used to first align each face image. The face images are then cropped into a single uniform size, such as 256×256 pixels. A larger or smaller size may be used, depending on the particular implementation.

Learning Class-to-Class Facial Features

After the pre-processing, the facial features that will be used for the class-to-class comparisons are learned 124. Psychological studies show that facial expressions are the outcomes of the movements of different facial muscles. The facial muscle movements are usually manifested by discernable variations in facial appearance. The varying components of facial appearance have been identified as action units (AU) as described above. In this operation, the AUs are not detected. Instead, a learning operation automatically seeks features that can well characterize facial muscle movements that distinguish different classes from each other. The features are identified with an awareness of AU features, but it is not necessary to identify each AU in each face.

Let S be a training dataset consisting of N normalized images (with an example size of 256×256 pixels) collected from M facial expression categories, and each facial expression category has $n_m$ training images. Each facial expression image $I_i$ is divided into 16×16 pixel patches with an overlapping stride of 8 pixels. Using these numerical values yields 961 image patches for each facial expression image. Different values may be used for the size of the normalization, the size of the patches, and the size of the stride to provide the same or a different number of total patches, depending on the particular implementation. Rather than determine AUs, for each independent class-to-class expression classification task this operation seeks an optimal combination of image patches.

With M facial expression categories, there are a total of M×(M−1)/2 different tasks t. For the $t^{th}$ task, let $x_k$ be the feature set to describe the appearances of Q candidate patches of the $k^{th}$ facial expression image (a 16-bin LBP (Local Binary Pattern) histogram is used herein as a test feature to describe each image patch). The objective function to be minimized may be formulated as follows:

$$\begin{cases} \underset{w,p}{\operatorname{argmin}} \left( \|w\| + \gamma \sum_{k=1}^{N_t} L(y_k, w, \operatorname{dot}(p, x_k)) \right) \\ \text{subject to: } \sum_{i}^{Q} p_i = P, \text{ and } p_i \in \{1, 0\} \end{cases} \quad \text{(Eq. 1)}$$

where w enforces the weights for feature selection, $L(y_k, w, \operatorname{dot}(p,x_k)) = \ln(1+\exp^{-y_k w^T \operatorname{dot}(p,x_k)})$ is the logistic loss function, the operation $\operatorname{dot}(p,x_k)$ indicates P image patches that are selected in the $t^{th}$ task, $N_t$ is the number of the images of any two facial expression categories, and $y_k$ is the binary facial expression label indicating the $k^{th}$ image is labeled as the first facial expression class (if $y_k=1$) or the other one (if $y_k=-1$), γ is a positive penalty parameter of the classification error. For simple and efficient implementation, in each class-to-class task, the classification rates may be computed for all candidate image patches, and then P=16 image patches with the highest recognition rates may be selected as the optimal combination. The features extracted from the learned image patches are referred to herein as AU-aware facial features, because they are not necessarily AU features.

Figure 2:
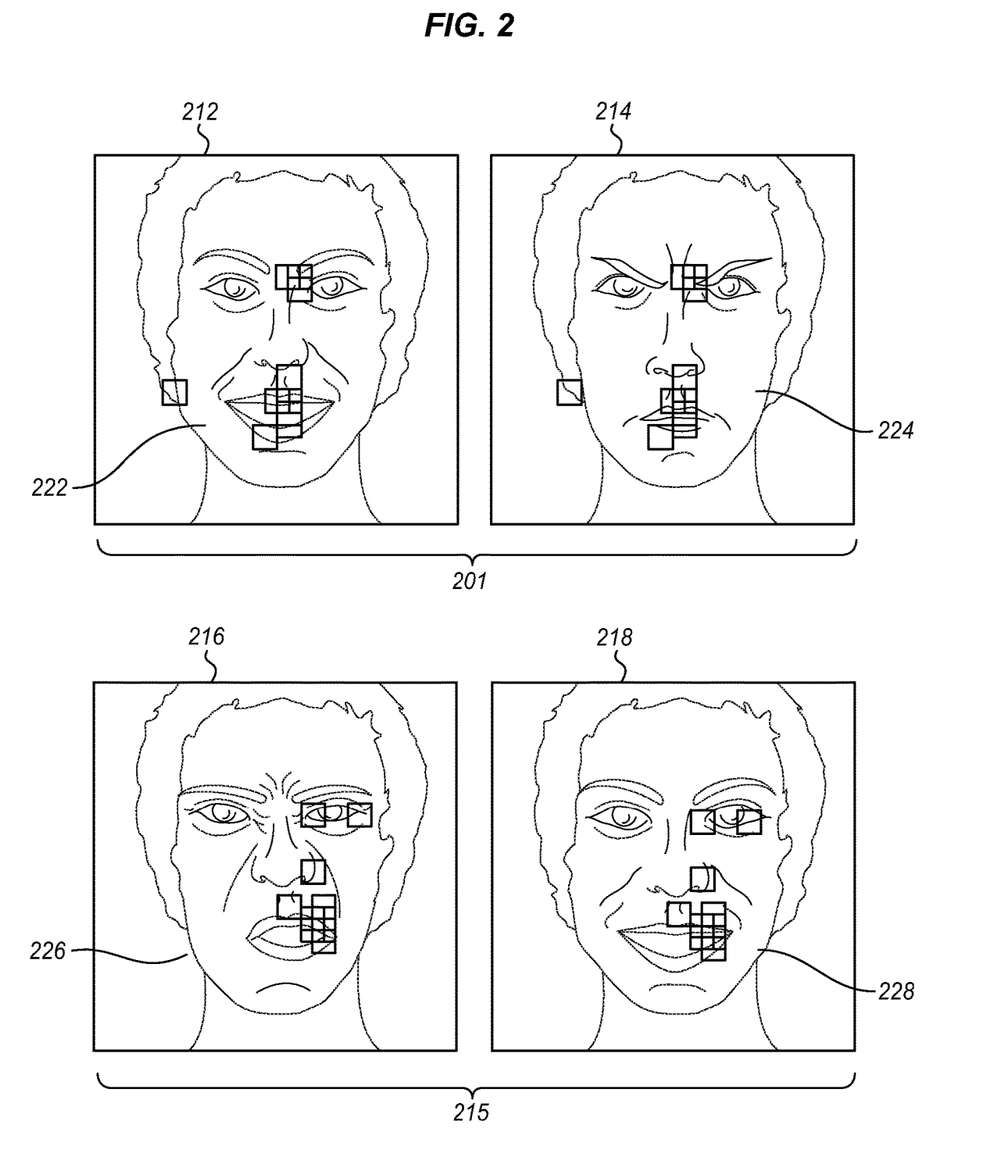
FIG. 2 is a drawing of example images in a class-to-class comparison to show discriminative image patches according to an embodiment.

FIG. 2 shows two examples 201, 215 of AU-aware facial feature groups. The two facial feature groups correspond to two different class comparisons. In the first group an image classified as Happy is compared to an image classified as Angry. In the last group an image classified as Disgust is compared to an image classified as Happy. If there are six different classes of facial expressions, then there will be 15 different such possible comparisons. This is indicated here as the first 201 and last 215 comparison type.

For the first class (Happy) to class (Angry) comparison 201 two previously annotated or classified images 212, 214 are used for training. The two images are compared and image patches 222, 224 are identified on each one. These two images 212 and 214 are provided as an example of the many images that are used in training. The images patches 222 and 224 are learned from using all of the training sample images for Happy and Angry. While two are shown there may be many more comparisons before the training is completed. These two images illustrate the positions of example learned image patches 222 and 224 for this specific task (Happy vs. Angry). The positions of the image patches selected for this task and shown in these two training images 222 and 224 are the same because the two images have been normalized to the same size. Because the expressions in the two images are different, different portions of the face may be captured using image patches that are in the same position. This part of the learning process seeks to find a set of discriminative image patches (or image positions) for classifying the two facial expression categories. A similar process is performed for each other pair of facial expression categories.

In this example ten image patches 222, 224 are identified for each of the two images. These are selected as corresponding to large differences between the images. The other image patches in the two images are more similar to each other. Accordingly, these ten image patches are well-suited to distinguishing the Happy image from the Angry image. More image patches may be used for greater precision or fewer may be used to simplify the process. In another example sixteen are used. As described above, for the normalized images provided by the pre-processing there are 961 image patches available and all of them may be used, depending on the particular implementation.

Similarly in the last class (Disgust) to class (Happy) comparison 215 ten different image patches 226, 228 are selected to best identify the difference between the two images 216, 218. The image patches may be selected based on identifying locations of AUs in the images or using any other suitable system of comparing facial features in the images. As indicated in these examples, a Happy image for example will have a larger space from the cheek to the center of the mouth than an Angry image. The image patches show many such feature comparisons. These image patches, after being learned may be applied for each of a sequence of tasks for classifying a facial expression for an unknown image.

Encoding Task-Specific Feature Relations with a Graph Structure

Figure 3:
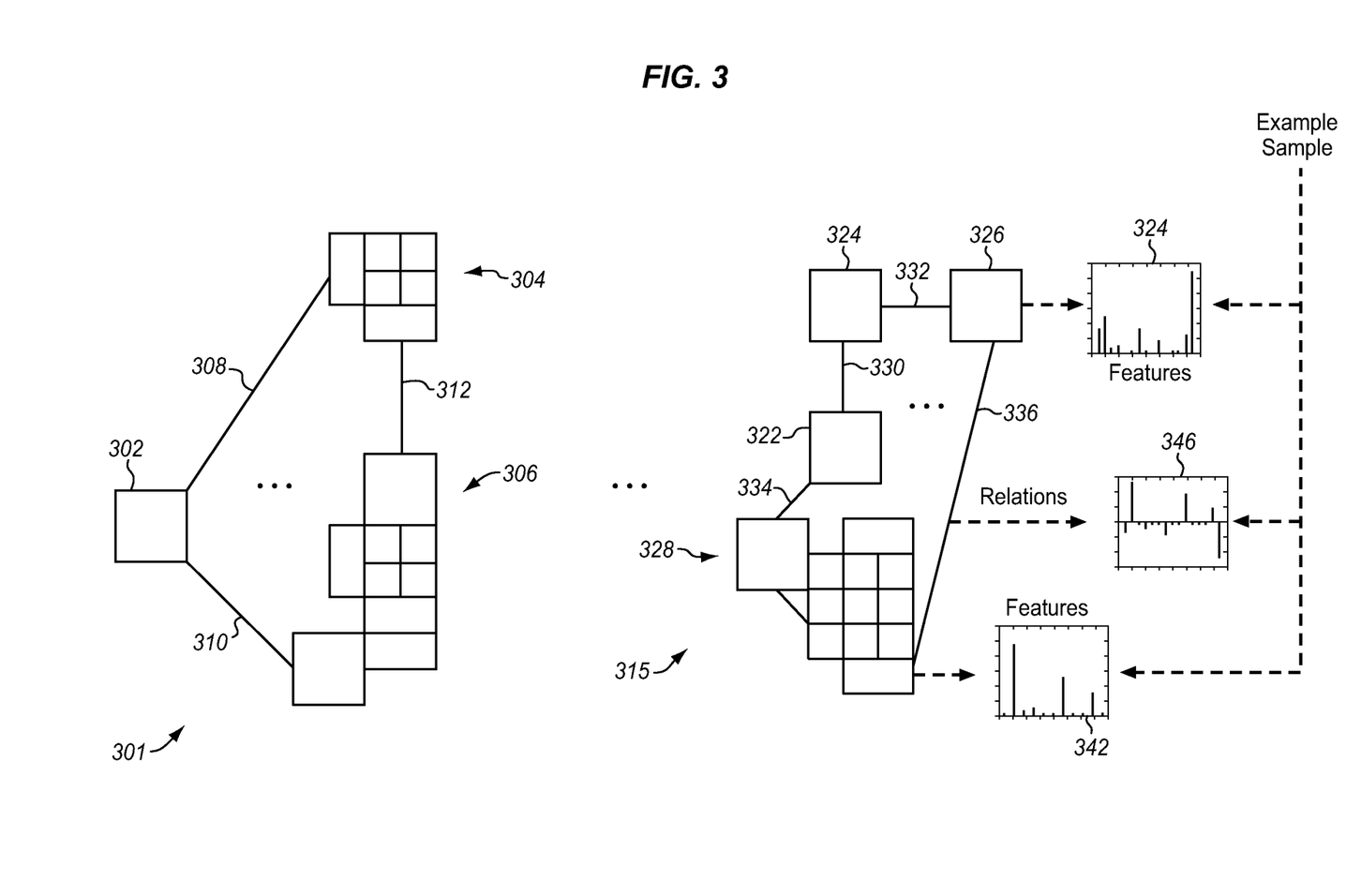
FIG. 3 is a diagram of graph structures using the image patches of FIG. 2 according to an embodiment.

FIG. 3 is a diagram of two graph structures using the image patches identified as shown in FIG. 2. For the first class-to-class task, three different features are identified from the image patches. The features are indicated as groups of image patches corresponding to the features. In this example, the features are the right cheek 302, the right corner of the left eye 304 and the center of the mouth and bottom of the nose 306. These features have relations to each other indicated by the connecting lines. So for example, the right cheek has a relation 308 to the left eye. The right cheek has a relation 310 to the mouth, and the left eye has a relation 312 to the mouth. As seen in FIG. 2 at 201, the relations between the facial features differ between the two classes. The features also may differ. The ellipsis is used to indicate other connected edges of the graph that are not shown in order to simplify the drawing.

In a similar way for the last class-to-class task, four different features are identified. These may be generalized as bottom left of the nose 322, the top left of the nose 324, the left corner of the left eye 326 and the mouth 328. The corresponding key image patches are represented in a graph 315 which also includes relations between these facial features. While every relation may be used as in graph 301 for the first task, for some tasks some relations may not be helpful to the task or may be less helpful compared to other relations. The feature relations may be computed as the feature differences (e.g., LBP histogram differences) between any two image patches. This allows for the determination of the graph structured relations.

The illustrated graphs may be considered as partially connected. Some connections are more important than others and this has been determined in the training process. The graphs may also be fully connected in that pairwise relations are calculated for every pair of learned image patches, not just for some pairs e.g. pair 3 or pair 4. The best image patches for a task are learned by using all of the training samples and grouping them into the class-to-class tasks e.g. Happy and Angry. The positions of the image patches of are not determined by the contents of the image or a part of the face but are a particular part of the normalized image size. The different appearances of the expressions will cause the image patches to have image contents with different expressions. These two example tasks illustrate the operation of seeking a set of discriminative image patches for classifying images in one of the two facial expression categories for each task.

The diagram of FIG. 3 indicates that many pair wise class-to-class comparisons may be made for each task. Only one comparison is shown as an example for the each of two different tasks. While the examples are provided in terms of six different basic facial expressions which provides fifteen different comparison tasks, more or fewer facial expressions may be used.

The two example graphs 301, 315 show how different features and different relations may be used for different tasks. This allows each task to be simplified to only those features and relations that are needed to perform the task. The accuracy and simplicity improve with better learning. Facial expression descriptors may then be constructed by stacking and concatenating all of the identified facial features contained in the task-specific graphs for each of the images into final descriptors 342, 344. Similarly all of the relations may also be stacked and concatenated into relation descriptors 346.

As illustrated by the examples of FIG. 2 and FIG. 3, for each class-to-class task 201, 301, 215, 315, after a respective AU-aware feature group has been learned, it can be used to address facial expression recognition directly. The facial feature group may also be used as a foundation with which to explore latent relations which are more discriminating for characterizing different facial expressions. Even a minor facial expression change is observed as a blend of the movements of several facial muscles.

To provide a more precise facial expression analysis, facial expressions are analyzed by exploring relations between the learned task-specific facial features. This can be expressed mathematically using a facial expression image $I_t$. Let $\{x_{i,1}, x_{i,2}, \ldots, x_{i,P}\}$ be the feature sets extracted from P image patches leaned in the $t^{th}$ task. In this example P=16, however a lower number may be used for greater simplicity or a higher number for greater precision. The relations within this facial feature group may be described as a fully connected undirected graph G as shown by example in FIG. 3. The graph may be defined as a set of the patches and their relations where $$G=\{V,E\},\qquad(\text{Eq. 2})$$

where V is the set of the locations of learned image patches and E contains n-D relations (where n=16 as an example) between any two image patches. The relation $e_{pq}$ may be computed as the feature difference between any two image patches as $$\begin{cases} e_{pq} = x_p - x_q \\ \text{where } x_p \text{ and } x_q \in R^n \end{cases}\qquad(\text{Eq. 3})$$

Figure 4:
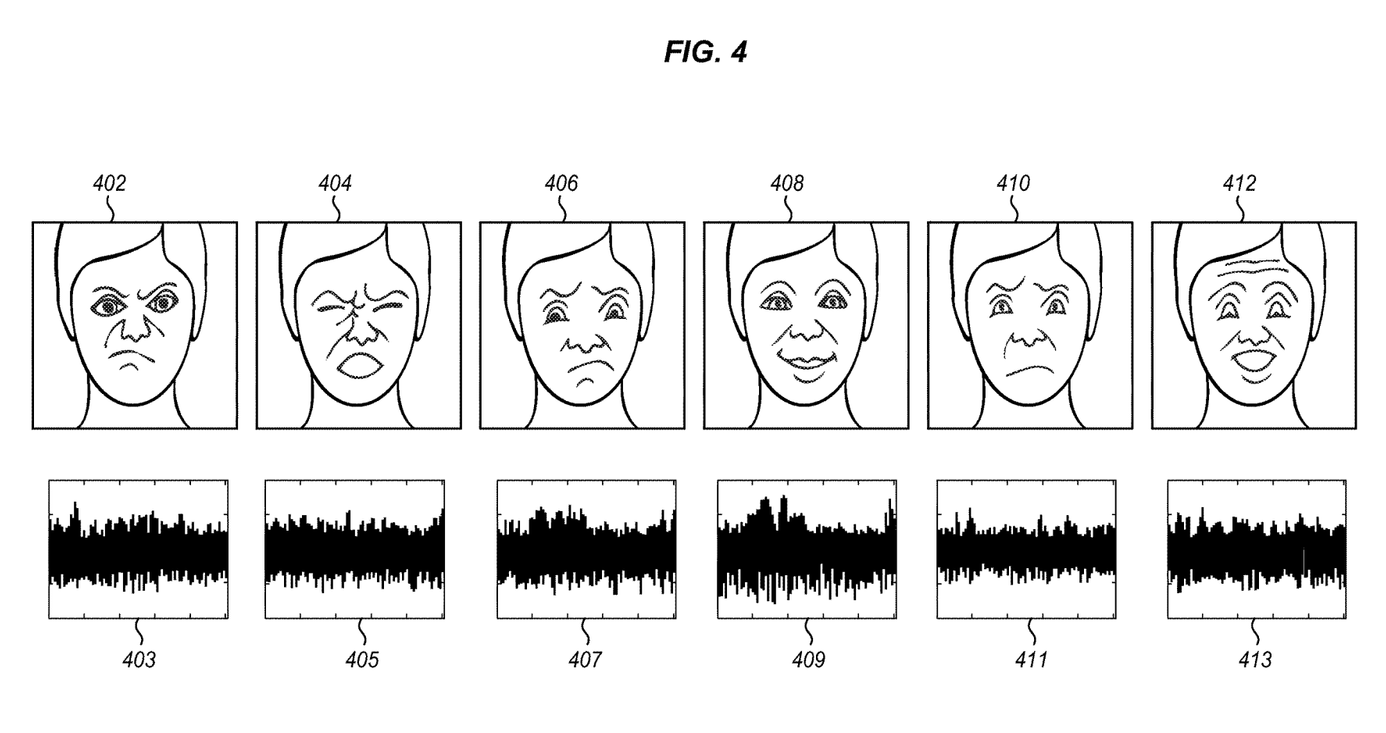
FIG. 4 is a diagram of facial expression classes with corresponding descriptors according to an embodiment.

FIG. 4 is a diagram of a set of facial expression classes or categories with example corresponding descriptors. From left to right there are six facial expressions corresponding to Angry 402, Disgust 404, Fear 406, Happy 408, Sadness 410, and Surprise 412. Below each example is a corresponding example of facial expression descriptors 403, 405, 407, 409, 411, 413 consisting of class-to-class facial feature relations.

In the illustrated descriptors, the horizontal axis denotes the indices of stacked feature relations, and the vertical axis denotes the values of feature relations. The final facial expression descriptor for each image is constructed in two steps. First, given an image, for each task, a fully or partially connected undirected graph is generated in which each edge has an n-dimensional feature relation as calculated with Equation 3. By concatenating and stacking feature relations from all edges of this graph sequentially, a respective sub-descriptor for this task is first extracted. Second, all sub-descriptors regarding all tasks are further concatenated and stacked sequentially. As a result, the final facial expression descriptor for this image is built, and it is used in the subsequent training procedure.

Training Facial Expression Models

Once the descriptors are computed using the training samples, they may be used to train a final facial expression model. As described above, the descriptors are built from graph-structured relations for each task-specific facial feature group for all of the training samples. The descriptors may be used as an input in any of a variety of different types of static classifiers, such as NN (Neural Network) or SVM (support vector machine) or of dynamic models, such as HMM (Hidden Markov Model) or CRF (Conditional Random Fields) to train a final facial expression model. In some embodiments, a linear SVM may be used directly.

Such a set of facial expression descriptors applied using linear SVM provide accuracy equal to or better than many existing more complex action unit-based techniques. This may be done using far fewer computations which allows the techniques to be applied to real time systems without excessive cost.

As described herein multi-task learning may be used to identify facial features for facial expression recognition. The latent feature relations characterizing the complex interactions of facial features may be identified for each respective task. Those features which are more important for discriminating facial expressions are used. The facial feature group suited for each class-to-class task is learned independently. As a result latent task-specific feature relations are encoded in an explicit manner. These class-to-class facial features and latent task-specific relations are encoded with an undirected graph structure that provides excellent performance with less computational complexity. The graph structures are stacked and concatenated to generate the facial expression descriptors.

Figure 5:
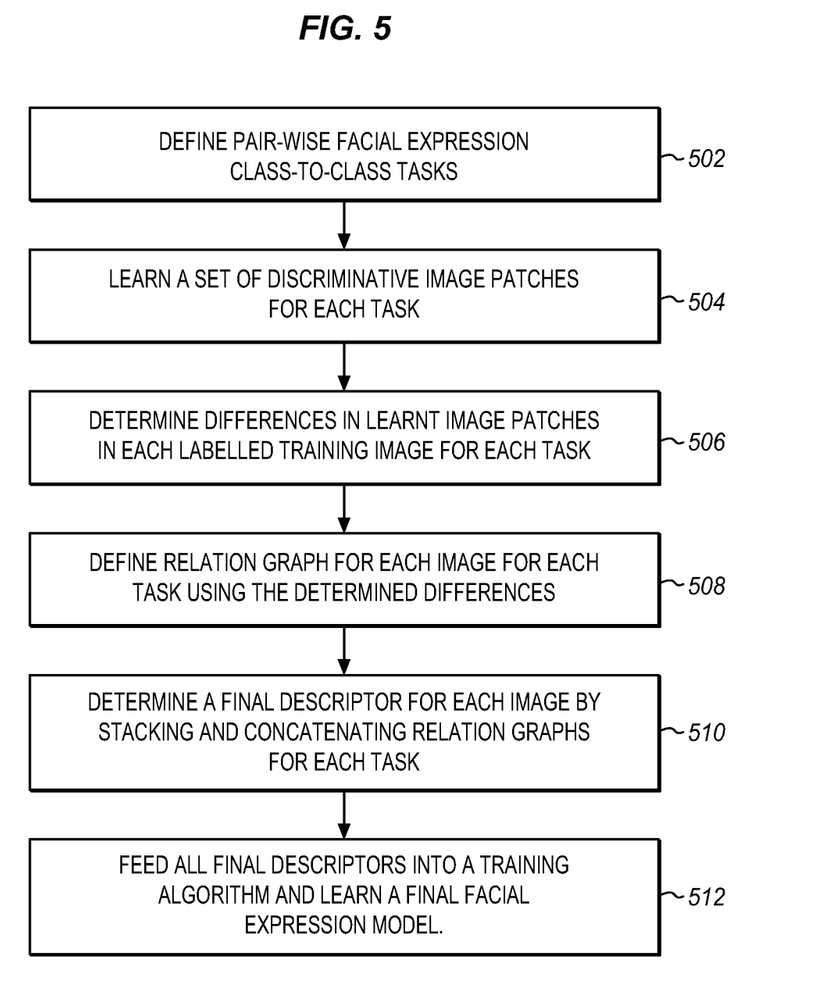
FIG. 5 is a process flow diagram of learning class-to-class facial expression descriptors according to an embodiment

FIG. 5 is a process flow diagram of a learning process. In this process, at 502, pair-wise facial expression tasks are defined. Each task is the comparison of one class to another class, e.g. Happy vs. Angry. The tasks are defined in terms of pairs so that only two classes are compared at a time.

For each pairwise-task (e.g., Happy vs. Angry), at 504, the set of image patches that is best able to discriminate between the two classes of the pair is learned using the training images. For each task, the system seeks a combination of the most discriminative image patches. In FIG. 3, this is shown as a selection of 10 image patches from all possible image patches. More or fewer patches may be used depending on the nature of the images and the classes. In the described example, each normalized face image is a square that is 256 pixels wide (horizontal) and 256 pixels (vertical) tall. The image patches are generated by taking 16×16 pixel blocks of the face image with an overlapping stride of 8 pixels. This gives 31 image patches horizontally and 31 image patches vertically, for a total of 961 total image patches. The particular number and size of the image patches may be adapted to suit different implementations. The result of this learning process is therefore an identification of the positions of 10 best image patches for the task.

In the described example, the face images are normalized during pre-processing 122. As a result, the faces are the same size and the image patches will all correspond to the same size portion of a face image in the same location in an image. For all normalized face samples of Happy and Angry, the learned image patches are at the same positions in each image but the image patches will not necessarily cover the same part of a face. As an example, if a happy mouth is open and an angry mouth is closed, then an image patch that includes the upper lip of a happy face may not include the upper lip of an angry face because the lips are in a different position. This is shown, for example, in FIG. 2.

The image patches may be learned, for example, by extracting LBP histograms from the image patches of the training images. The histograms are compared between pairs of images to determine which histograms show the greatest difference for each pair. The corresponding image patches are then those that are best able to discriminate between the two images of the pair for that task. At 506, the differences between the learned image patches for the annotated or labelled training images and for each task are determined.

At 508, the determined differences are used to define a relation graph for each image of each task. From the multi-task pair-wise learning, a set of respective combinations of image patches are learned. Using these, the AU-aware features can be extracted for each normalized training image. Graph structured feature differences may then be constructed for each pair-wise task.

At 510 all of the feature differences from the graphs regarding all of the pair-wise tasks are stacked and concatenated together to determine a final descriptor for each image.

At 512, these descriptors are fed into a training algorithm to train final facial expression models. The models may be SVMs, NNs, HMM, etc.

Figure 6:
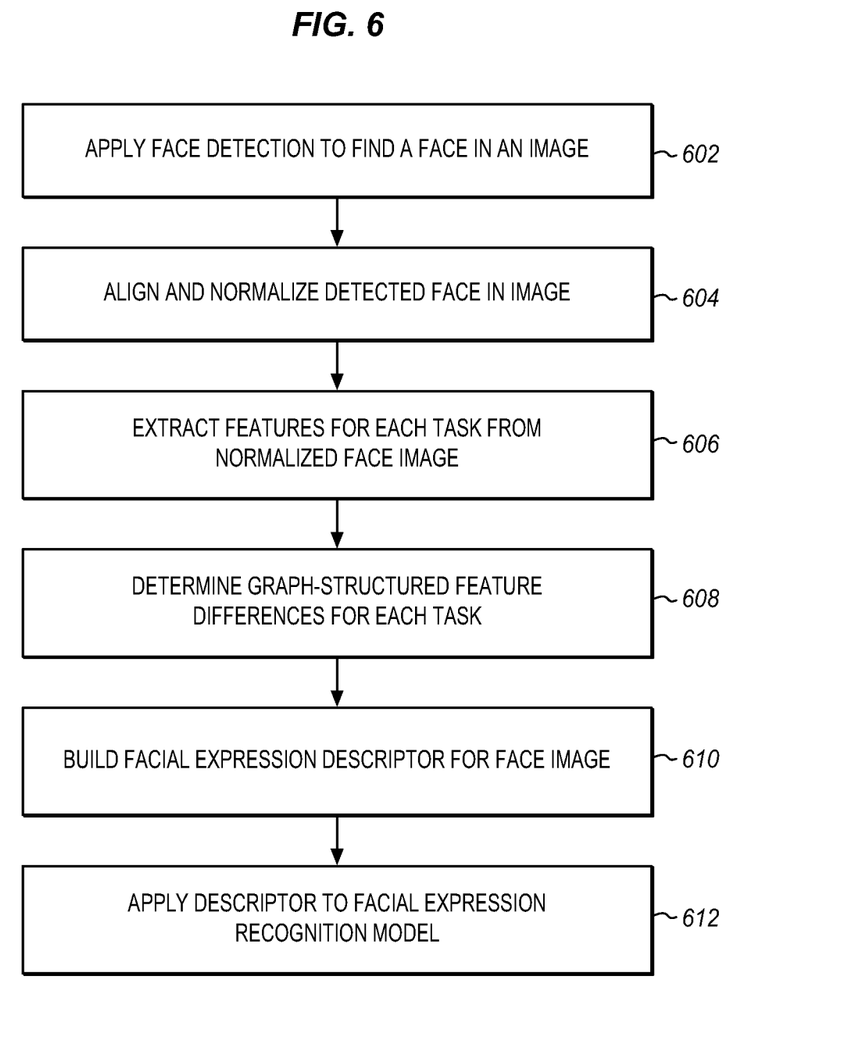
FIG. 6 is a process flow diagram of facial expression recognition using a facial recognition model according to an embodiment.

FIG. 6 is a process flow diagram of classifying an image using the trained facial expression models. In this process flow the learned combinations of image patches (e.g., positions) are used to test an unclassified image against the descriptors. A descriptor is generated using the image patches that have the same length as the training descriptors. This descriptor may be fed directly into the offline trained facial expression model for recognition.

As shown, first at 602, face detection is applied to find a face in the new image. If there are multiple faces, then a primary face is selected or the expression may be recognized for multiple faces.

At 604, the detected face is aligned within a portion of the image and normalized. This may be done in the same way as the pre-processing 122 described above. At 606, the features for each pair wise or class-to-class task are extracted. At 608, graph-structured feature differences are determined for each pair-wise task. This is used at 610 to build a facial expression descriptor for the image. At 612, the facial expression descriptor is then applied to the trained facial expression recognition model and the face image may then be classified as being in one of the trained classes. As a result, the originally unclassified face image at 604 is finally classified.

Figure 7:
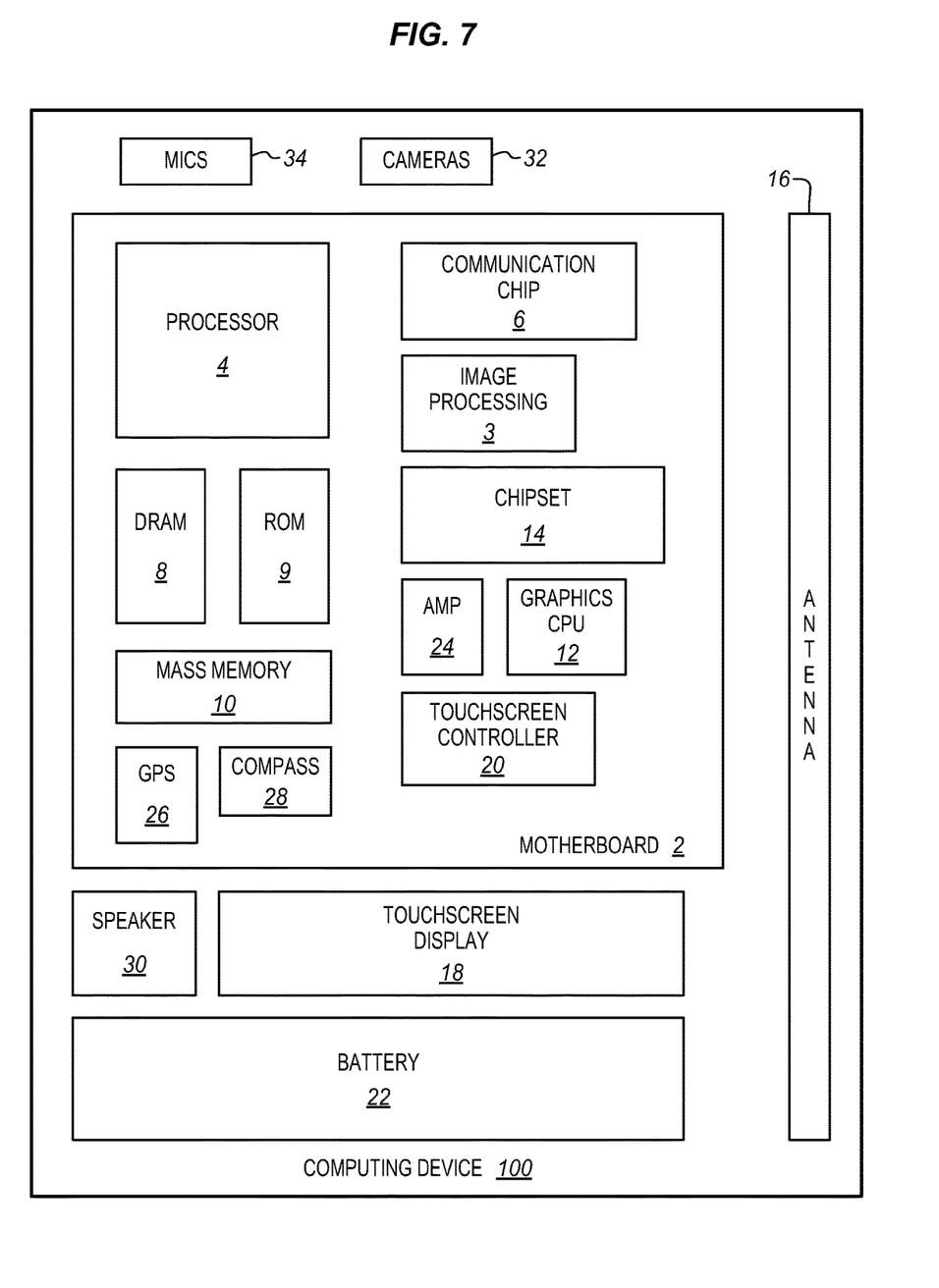
FIG. 7 is a block diagram of a computing device incorporating facial expression recognition according to an embodiment.

FIG. 7 is a block diagram of a single computing device 100 in accordance with one implementation. The computing device 100 houses a system board 2. The board 2 may include a number of components, including but not limited to a processor 4 and at least one communication package 6. The communication package is coupled to one or more antennas 16. The processor 4 is physically and electrically coupled to the board 2.

Depending on its applications, computing device 100 may include other components that may or may not be physically and electrically coupled to the board 2. These other components include, but are not limited to, volatile memory (e.g., DRAM) 8, non-volatile memory (e.g., ROM) 9, flash memory (not shown), a graphics processor 12, a digital signal processor (not shown), a crypto processor (not shown), a chipset 14, an antenna 16, a display 18 such as a touchscreen display, a touchscreen controller 20, a battery 22, an audio codec (not shown), a video codec (not shown), a power amplifier 24, a global positioning system (GPS) device 26, a compass 28, an accelerometer (not shown), a gyroscope (not shown), a speaker 30, a camera 32, a microphone array 34, and a mass storage device (such as hard disk drive) 10, compact disk (CD) (not shown), digital versatile disk (DVD) (not shown), and so forth). These components may be connected to the system board 2, mounted to the system board, or combined with any of the other components.

The communication package 6 enables wireless and/or wired communications for the transfer of data to and from the computing device 100. The term "wireless" and its derivatives may be used to describe circuits, devices, systems, methods, techniques, communications channels, etc., that may communicate data through the use of modulated electromagnetic radiation through a non-solid medium. The term does not imply that the associated devices do not contain any wires, although in some embodiments they might not. The communication package 6 may implement any of a number of wireless or wired standards or protocols, including but not limited to Wi-Fi (IEEE 802.11 family), WiMAX (IEEE 802.16 family), IEEE 802.20, long term evolution (LTE), Ev-DO, HSPA+, HSDPA+, HSUPA+, EDGE, GSM, GPRS, CDMA, TDMA, DECT, Bluetooth, Ethernet derivatives thereof, as well as any other wireless and wired protocols that are designated as 3G, 4G, 5G, and beyond. The computing device 100 may include a plurality of communication packages 6. For instance, a first communication package 6 may be dedicated to shorter range wireless communications such as Wi-Fi and Bluetooth and a second communication package 6 may be dedicated to longer range wireless communications such as GPS, EDGE, GPRS, CDMA, WiMAX, LTE, Ev-DO, and others.

The cameras 32 are coupled to an image processing chip 36 to perform format conversion, coding and decoding, noise reduction and 3D mapping as described herein. The processor 4 is coupled to the image processing chip to drive the processes, set parameters, etc.

In various implementations, the computing device 100 may be eyewear, a laptop, a netbook, a notebook, an ultrabook, a smartphone, a tablet, a personal digital assistant (PDA), an ultra mobile PC, a mobile phone, a desktop computer, a server, a set-top box, an entertainment control unit, a digital camera, a portable music player, or a digital video recorder. The computing device may be fixed, portable, or wearable. In further implementations, the computing device 100 may be any other electronic device that processes data.

Embodiments may be implemented as a part of one or more memory chips, controllers, CPUs (Central Processing Unit), microchips or integrated circuits interconnected using a motherboard, an application specific integrated circuit (ASIC), and/or a field programmable gate array (FPGA).

References to "one embodiment", "an embodiment", "example embodiment", "various embodiments", etc., indicate that the embodiment(s) so described may include particular features, structures, or characteristics, but not every embodiment necessarily includes the particular features, structures, or characteristics. Further, some embodiments may have some, all, or none of the features described for other embodiments.

In the following description and claims, the term "coupled" along with its derivatives, may be used. "Coupled" is used to indicate that two or more elements co-operate or interact with each other, but they may or may not have intervening physical or electrical components between them.

As used in the claims, unless otherwise specified, the use of the ordinal adjectives "first", "second", "third", etc., to describe a common element, merely indicate that different instances of like elements are being referred to, and are not intended to imply that the elements so described must be in a given sequence, either temporally, spatially, in ranking, or in any other manner.

The drawings and the forgoing description give examples of embodiments. Those skilled in the art will appreciate that one or more of the described elements may well be combined into a single functional element. Alternatively, certain elements may be split into multiple functional elements. Elements from one embodiment may be added to another embodiment. For example, orders of processes described herein may be changed and are not limited to the manner described herein. Moreover, the actions of any flow diagram need not be implemented in the order shown; nor do all of the acts necessarily need to be performed. Also, those acts that are not dependent on other acts may be performed in parallel with the other acts. The scope of embodiments is by no means limited by these specific examples. Numerous variations, whether explicitly given in the specification or not, such as differences in structure, dimension, and use of material, are possible. The scope of embodiments is at least as broad as given by the following claims.

The following examples pertain to further embodiments. The various features of the different embodiments may be variously combined with some features included and others excluded to suit a variety of different applications. Some embodiments pertain to a method of determining descriptors for each of a plurality of facial expression classes for expression class recognition, that includes defining a plurality of pair-wise facial expression class-to-class tasks, learning a set of discriminative image patches for each task using a plurality of labelled training images for each task, each image patch being a portion of an image, determining differences in the learned image patches in each training image for each task, defining a relation graph for each image for each task using the determined differences, determining a final descriptor for each image by stacking and concatenating the relation graphs for each task, and feeding the final descriptors of the images of the plurality of training images into a training algorithm and learning a final facial expression model.

In further embodiments defining a plurality of pair-wise facial expression class-to-class tasks includes defining a plurality of facial expression classes, and defining a task for comparing each class to each other class.

In further embodiments selecting a set of image patches comprises defining a number of image patches to be used for each task using the plurality of training images.

In further embodiments the number of image patches is the same for each task.

Further embodiments include pre-processing the plurality of training images to normalize the number of pixels in each task and to define all image patches for each image as a uniform number of pixels in each patch with an overlap between adjacent patches.

In further embodiments selecting a set of image patches comprises selecting a set of image patches based on recognizing differences between pairs for the task.

In further embodiments selecting a set of image patches further comprises selecting image patches using a logistic loss function to compare candidate image patches and select those with the highest recognition rate.

In further embodiments defining a relation graph comprises defining relations between respective image patches for each image pair for each task.

In further embodiments defining relations comprises determining relations based on a recognition of difference between pairs for the task.

Further embodiments include applying each of the descriptors to an unclassified image to determine a class for the unclassified image.

Some embodiments pertain to a method that includes extracting features for a plurality of class-to-class tasks from a face image for each of a plurality of facial expression classes for expression class recognition, determining graph-structured feature differences for each task, building a facial expression descriptor for each class for the face image, and applying the facial expression descriptors to a facial expression recognition model to determine an expression for the face image.

Further embodiments include applying face detection to find a face image in an image that includes a face.

Further embodiments include aligning and normalizing the face image before extracting features.

In further embodiments the graph structured feature differences are from an offline trained facial expression model.

Some embodiments pertain to a computer-readable medium having instructions thereon that, when operated on by the machine, cause the machine to perform operations that include defining a plurality of pair-wise facial expression class-to-class tasks, learning a set of discriminative image patches for each task using a plurality of labelled training images for each task, each image patch being a portion of an image, determining differences in the learned image patches in each training image for each task, defining a relation graph for each image for each task using the determined differences, determining a final descriptor for each image by stacking and concatenating the relation graphs for each task, and feeding the final descriptors of the images of the plurality of training images into a training algorithm and learning a final facial expression model for expression class recognition.

In further embodiments selecting a set of image patches comprises selecting a set of image patches based on recognizing differences between pairs for the task.

In further embodiments selecting a set of image patches further comprises selecting image patches using a logistic loss function to compare candidate image patches and select those with the highest recognition rate.

Some embodiments pertain to an apparatus that includes an image sensor to receive an image containing a face, a memory to store a facial recognition model, and a processor to extract features for a plurality of class-to-class tasks from a face image of the received image for each of a plurality of facial expression classes for expression class recognition, to determine graph-structured feature differences for each task, to build a facial expression descriptor for each class for the face image and to apply the facial expression descriptors to a facial expression recognition model to determine an expression for the face image.

Further embodiments include applying face detection to find a face image in an image that includes a face.

Further embodiments include aligning and normalizing the face image before extracting features.

The invention claimed is:

1. A method of determining descriptors for each of a plurality of facial expression classes for expression class recognition, the method comprising:
    defining a plurality of pair-wise facial expression class-to-class tasks;
    learning a set of discriminative image patches for each task using a plurality of labelled training images for each task, each image patch being a portion of an image;
    determining differences in the learned image patches in each training image for each task;
    defining a relation graph for each image for each task using the determined differences, the relation graph representing connections of a subset of image patches containing different facial image features having relations to each other;
    determining a final descriptor for each image by stacking and concatenating the relation graphs for each task; and
    determining a facial expression for a face by feeding the final descriptors of the images of the plurality of training images into a training algorithm and learning a final facial expression model.

2. The method of claim 1, wherein defining a plurality of pair-wise facial expression class-to-class tasks comprises:

defining a plurality of facial expression classes; and
defining a task for comparing each class to each other class.

3. The method of claim 1, wherein selecting a set of image patches comprises defining a number of image patches to be used for each task using the plurality of training images.

4. The method of claim 3, wherein the number of image patches is the same for each task.

5. The method of claim 1, further comprising pre-processing the plurality of training images to normalize the number of pixels in each task and to define all image patches for each image as a uniform number of pixels in each patch with an overlap between adjacent patches.

6. The method claim 1, wherein selecting a set of image patches comprises selecting a set of image patches based on recognizing differences between pairs for the task.

7. The method of claim 6, wherein selecting a set of image patches further comprises selecting image patches using a logistic loss function to compare candidate image patches and select those with the highest recognition rate.

8. The method of claim 1, wherein defining a relation graph comprises defining relations between respective image patches for each image pair for each task.

9. The method of claim 8, wherein defining relations comprises determining relations based on a recognition of difference between pairs for the task.

10. The method of claim 1, further comprising applying each of the descriptors to an unclassified image to determine a class for the unclassified image.

11. A non-transitory computer-readable medium having instructions thereon that, when operated on by the machine, cause the machine to perform operations comprising:

defining a plurality of pair-wise facial expression class-to-class tasks;
learning a set of discriminative image patches for each task using a plurality of labelled training images for each task, each image patch being a portion of an image;
determining differences in the learned image patches in each training image for each task;
defining a relation graph for each image for each task using the determined differences, the relation graph representing connections of a subset of image patches containing different facial image features having relations to each other;
determining a final descriptor for each image by stacking and concatenating the relation graphs for each task; and
determining a facial expression for a face by feeding the final descriptors of the images of the plurality of training images into a training algorithm and learning a final facial expression model for expression class recognition.

12. The medium of claim 11, wherein selecting a set of image patches comprises selecting a set of image patches based on recognizing differences between pairs for the task.

13. The medium of claim 12, wherein selecting a set of image patches further comprises selecting image patches using a logistic loss function to compare candidate image patches and select those with the highest recognition rate.

14. The method of claim 1, wherein the images patches are rectangular patches of the image.

15. The method of claim 1, wherein the relations comprise feature relations computed as feature differences between any two image patches.

* * * * *